United States Patent
Anderson

(10) Patent No.: US 6,715,294 B2
(45) Date of Patent: Apr. 6, 2004

(54) COMBINED OPEN CYCLE SYSTEM FOR THERMAL ENERGY CONVERSION

(75) Inventor: Rodger O. Anderson, Scotia, NY (US)

(73) Assignee: DRS Power Technology, Inc., Parsippany, NJ (US)

(*) Notice: Subject to any disclaimer, the term of this patent is extended or adjusted under 35 U.S.C. 154(b) by 37 days.

(21) Appl. No.: 10/055,802

(22) Filed: Jan. 23, 2002

(65) Prior Publication Data

US 2002/0116930 A1 Aug. 29, 2002

Related U.S. Application Data

(60) Provisional application No. 60/263,936, filed on Jan. 24, 2001.

(51) Int. Cl.$^7$ ................................. F02C 1/00
(52) U.S. Cl. .................. 60/772; 60/39.181; 60/39.182; 60/39.5
(58) Field of Search ................ 60/39.5, 227, 772, 60/39.181, 39.182, 39.461, 39.52, 641.3, 641.5, 655, 668, 736, 775, 784; 415/139, 148, 159, 160; 310/10, 11

(56) References Cited

U.S. PATENT DOCUMENTS

| | | | |
|---|---|---|---|
| 2,652,034 A | * 9/1953 | Baillot et al. | 91/160 |
| 3,087,304 A | 4/1963 | Walter | 60/39 |
| 3,232,052 A | * 2/1966 | Ricard | 60/39.18 |

(List continued on next page.)

FOREIGN PATENT DOCUMENTS

WO WO99/37901 7/1999

OTHER PUBLICATIONS

William & Larson, May 1988, World Bank, Princeton University, 12 pages.*

*Primary Examiner*—Edward K. Look
*Assistant Examiner*—John F. Belena
(74) *Attorney, Agent, or Firm*—Norris, McLaughlin & Marcus

(57) ABSTRACT

A dual-fluid heat engine having a gas turbine and an open cycle steam turbine. The gas turbine has a compressor for compressing a first working fluid, the compressor having a compressor outlet. The gas turbine has a combustion chamber in fluid communication with the compressor outlet. The turbine portion of the gas turbine has an inlet in fluid communication with the combustion chamber for performing work by expansion of the first working fluid, and a gas turbine exhaust. A heat recovery exchanger is coupled to the gas turbine exhaust having a heat recovery inlet and an outlet for heating a second working fluid, water. The water is converted into steam in the heat recovery exchanger. A pump increases the pressure of the water prior to entrance in the heat recovery exchanger. An atmospheric exhaust expansion steam turbine extracts energy from the heated second working fluid to drive an electrical generator. An exhaust chimney takes the gas turbine exhaust and the steam turbine exhaust and rejects it into the atmosphere.

17 Claims, 3 Drawing Sheets

U.S. PATENT DOCUMENTS

| | | | |
|---|---|---|---|
| 3,359,723 A | * 12/1967 | Bohensky et al. | 60/39.05 |
| 3,422,800 A | * 1/1969 | La Haye | 122/7 |
| 4,366,674 A | * 1/1983 | Eakman | 60/618 |
| 4,479,355 A | * 10/1984 | Guide et al. | 60/683 |
| 4,660,376 A | 4/1987 | Johnson | 60/39.05 |
| 4,785,621 A | 11/1988 | Alderson et al. | 60/39.12 |
| 4,854,121 A | 8/1989 | Arii et al. | 60/39.182 |
| 4,896,499 A | * 1/1990 | Rice | 60/39.161 |
| 5,170,622 A | 12/1992 | Cheng | 60/39.05 |
| 5,271,215 A | 12/1993 | Guillet | 60/37.5 |
| 5,428,950 A | 7/1995 | Tomlinson et al. | 60/39.02 |
| 5,442,908 A | 8/1995 | Briesch et al. | 60/39.182 |
| 5,595,059 A | * 1/1997 | Huber et al. | 60/39.02 |
| 5,632,143 A | * 5/1997 | Fisher et al. | 60/39.182 |
| 5,664,414 A | * 9/1997 | Bronicki et al. | 60/39.182 |
| 5,813,215 A | 9/1998 | Weisser | 60/39.181 |
| 5,970,714 A | * 10/1999 | Bronicki et al. | 60/641.3 |
| 6,109,020 A | * 8/2000 | Liebig | 60/39.182 |
| 6,173,679 B1 | * 1/2001 | Brückner et al. | 122/406.4 |
| 6,230,480 B1 | * 5/2001 | Rollins, III | 60/39.182 |
| 6,237,542 B1 | 5/2001 | Nakajo et al. | 122/7 R |
| 6,279,311 B1 | 8/2001 | Goto | 60/39.182 |
| 6,311,474 B2 | 11/2001 | Muyama et al. | 60/39.55 |
| 6,332,321 B1 | 12/2001 | Bronicki et al. | 60/728 |
| 2001/0023576 A1 | 9/2001 | Rollins | 60/39.02 |
| 2002/0100271 A1 | * 8/2002 | Viteri et al. | 60/39.182 |

* cited by examiner

COMBINED OPEN CYCLE SYSTEM FOR THERMAL ENERGY CONVERSION

CROSS REFERENCES TO RELATED APPLICATIONS

The present application claims the benefit of U.S. Provisional Patent Application No. 60/263,936, filed Jan. 24, 2001. The entire contents of the above application are incorporated herein by reference in entirety.

BACKGROUND OF THE INVENTION

The generation of electrical power is a complex matter which is dependent in part on the amount of power required on the grid. Therefore, the amount of power being generated varies widely depending on the time of day, day of the week, and atmospheric conditions such as cold spells and heat waves. While the amount of power varies, it is recognized that maximum efficiencies are achieved by operating power generation systems at a steady state or near steady state conditions. With this in mind, there has been an increased use of gas turbine systems that may be added online to the grid to provide additional power in that gas turbine systems typically are well suited for ease of being brought online quickly therefore being either in a standby or running mode. However, gas turbines are recognized as being not as efficient as other plant systems such as large steam plants because of the gas turbine system being an open cycle where approximately 60 to 70 percent of the energy is lost in waste heat energy.

One method of increasing efficiency that has been recognized is a combined cycle power plant in which a gas turbine, also referred to as a topping cycle, transfers its exhaust waste heat through a heat recovery system to a closed cycle heat engine such as a steam turbine. To capture the exhaust steam energy in these steam turbines, the steam turbine operates in a closed cycle that adds a circulating water system, a condensate water system, and a large cooling trap to reject the low energy heat.

SUMMARY OF THE INVENTION

The invention relates to a combined cycle system having an open cycle system using a fuel to create power and expending an exhaust with a waste heat. The system has a heat recovery exchanger for transferring heat from the exhaust with waste heat to the heat exchange fluid. A second open cycle system uses the heat exchange fluid to create power and expend the heat exchange fluid.

In one embodiment, the first open cycle system is a gas turbine, the second open cycle system is a steam turbine. The heat exchange fluid is water in a fluid and gaseous state. A pump moves and pressurizes the water to the heat recovery exchanger.

In one embodiment, an exhaust system combines the exhaust from the first open cycle and the heat exchange fluid from the second open cycle.

In one embodiment, the heat recovery exchanger is a once-through exchanger. In another embodiment, the heat recovery exchanger is a drum boiler. A purifier cleans the water prior to entering the heat recovery exchanger to remove dissolved minerals.

The steam turbine in the combined cycle system produces power in a range of between 30 to 45 percent of the power produced by the gas turbine. In one embodiment, the power produced is approximately 35 percent of the power produced by the gas turbine.

A dual-fluid heat engine has a gas turbine and a steam turbine. The gas turbine has a compressor section, a combustion chamber section, and a hot expansion turbine section. The compressor section compresses a first working fluid. The combustion chamber section is in fluid communication with the compressor outlet and mixes the air with the fuel to ignite and produce a hot first working fluid. The turbine section of the gas turbine has an inlet in fluid communication with the combustion chamber section for performing work by expansion of the first working fluid. In addition to producing mechanical energy, the gas turbine expends an exhaust fluid.

The steam turbine is an atmospheric exhaust expansion steam turbine. The steam turbine extracts energy from the heated second working fluid, steam, to drive a shaft to produce mechanical energy.

A heat recovery exchanger is coupled to the gas turbine exhaust and has a heat recovery inlet and an outlet for heating the second working fluid, water. The heat recovery exchanger extracts heat from the gas turbine exhaust to heat the water to produce water in a gaseous state, steam. A pump increases the pressure of the second working fluid prior to entrance into the heat recovery exchanger.

The steam turbine, likewise expends an exhaust in addition to producing mechanical energy. An exhaust chimney takes the gas turbine exhaust and the steam turbine exhaust, steam, and combines and rejects the exhausts into the atmosphere. The mechanical energy produced by both the gas turbine and the steam turbine drive electric generators.

The foregoing and other features and advantages of the system and method of the invention will be apparent from the following more particular description of preferred embodiments of the system and method as illustrated in the accompanying drawings in which like reference characters refer to the same parts throughout the different views.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
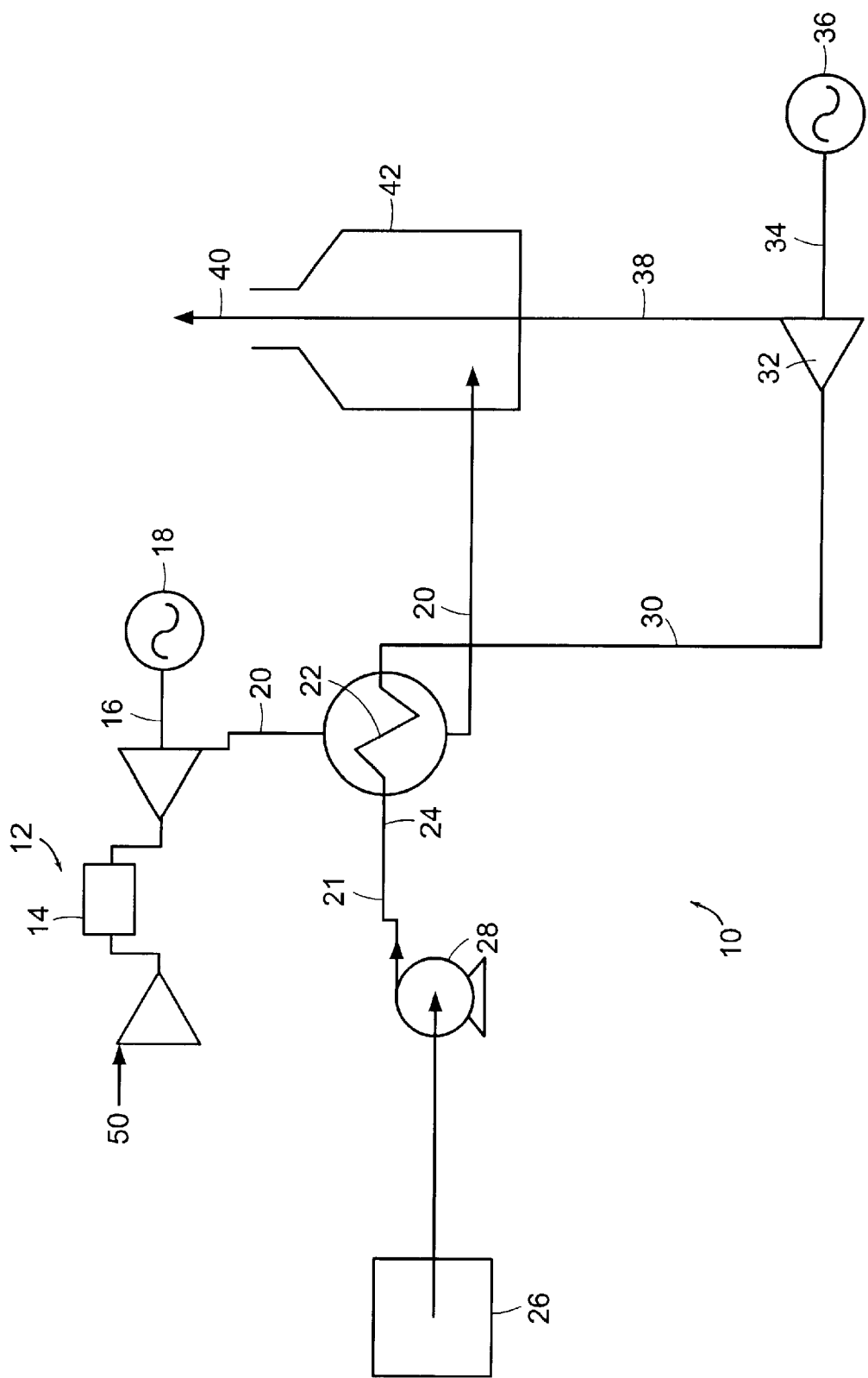
FIG. 1 is a schematic of a combined cycle plant according to the invention.

Referring to the drawings in detail, where like numerals indicate like elements, there is illustrated a combined cycle plant according to the invention generally referred to as 10.

Referring to FIG. 1, the combined cycle plant 10 in one embodiment has a gas turbine 12 that receives air 50 and fuel 14 and produces a rotation force to a shaft 16 to drive an electric generator 18. In addition, the gas turbine 12 creates an exhaust gas 20. In one embodiment, as discussed below, the exhaust gas 20 is at a flow of 2,367,000 lbs/hour at a temperature of 1000° F.

The exhaust gas 20 is used to heat a heat exchange fluid 21 in a heat recovery steam generator 22. In one embodiment, the heat exchange fluid 21 is water. The water in a liquid state 24 is sent to the heat recovery steam generator 22 from a water supply 26.

The water in the liquid state 24 prior to the heat recovery steam generator 22 is treated to remove dissolved minerals from the water, such as iron, calcium, and silicon.

The water supply 26 can include a de-mineralization system, an acid/caustic system or other systems to treat the water.

The combined cycle plant 10 has a pump 28 to move the water 24 from the water supply 26 to the heat recovery steam generator 22. The pump 28 in addition pressurizes the heat recovery steam generator 22.

The liquid water 24, the heat exchange fluid 21, is converted to water in gaseous state, steam 30, in the heat recovery steam generator 22. The steam 30 is sent to a steam turbine 32.

In the steam turbine 32, the energy of the pressurized steam is extracted to rotate a shaft 34. The shaft 34 drives a second electric generator 36. It is recognize that both the shaft 16 of the gas turbine 12 and the shaft 34 of the steam turbine 32 can drive a single electric generator.

The exhaust gas 20 from the gas turbine 12 after passing through the heat recovery steam generator 22 and a steam exhaust 38 from the steam turbine 32 are mixed to form an exhaust gas/steam mixture 40. The exhaust gas/steam mixture 40 is mixed and vented to atmosphere through an exhaust stack 42.

In the past few years the electrical infrastructure of the industrialized nations has experienced shortfalls in the generation, transmission and distribution of electricity into the rapidly growing urban areas. These areas have very limited space available for locating new power plants and transmission lines and in many cases the better option is to quickly upgrade existing local community plants so the power can go directly to the distribution system, thus, bypassing the overloaded transmission lines. This invention provides for an economical and quick upgrade of any simple cycle gas turbine or reciprocating engine power plant. Improvement in power and heat rate up to approximately 35% can be achieved without subjecting the existing engine to any increased loads, forces or stresses. Also, this plant upgrade puts no additional burden on the local fuel delivery infrastructure unlike the fuel requirements of an added new power plant. All of the additional electric power is produced with no increase in the emissions of harmful gases and also, the total power plant heat rejection is reduced. While a gas turbine 12 is shown with respect to FIGS. 1 and 2, it is recognized that the invention can be used with other open cycle systems. For example, the invention can work with a reciprocating engine power plant, such as a diesel.

Figure 2:
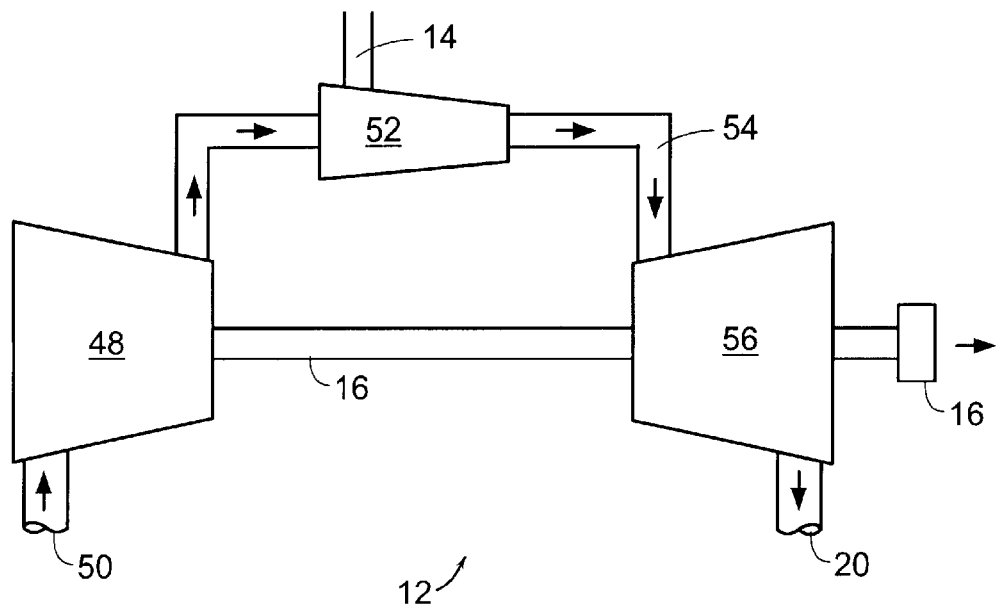
FIG. 2 is a schematic of a gas turbine.

With the combined cycle plant 10 described and some of the benefits, individual components of the combined cycle plant 10 are described. Referring to FIG. 2, the gas turbine 12 of the combined cycle plant has a compressor 48 that compresses air 50. The air 50 and the fuel 14 are mixed in a combustion chamber 52 of the gas turbine 12. The mixture is ignited and burned to produce a hot working fluid 54. The working fluid 54 pushes a series of blades in a turbine 56 of the gas turbine 12. This produces a rotational force that spins the compressor 48 in addition to rotating the shaft 16 connected to the electric generator 18, as seen in FIG. 1, to produce electric power. In addition to rotating the shaft 16 that is connected to the electric generator 18, a product of the combustion of the fuel and the air in the gas turbine 12 is the hot exhaust gas 20. The hot exhaust gas 20 is directed from the gas turbine 12 through the heat recovery steam generator 22 that is described in greater detail in FIGS. 4 and 5.

Figure 3:
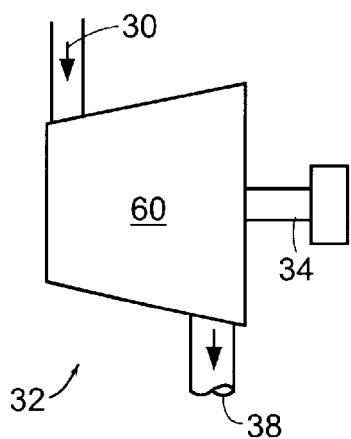
FIG. 3 is a schematic of a steam turbine.

Referring to FIG. 3, the steam turbine 32 of the combined cycle plant 10 is shown. The steam turbine 32 is an open cycle system in that the exhaust steam 38 is vented to atmosphere. This is in contrast to a closed cycle in which the dynamic fluid does not enter or leave the system but is used over and over again such as in a closed cycle steam turbine. In addition, in closed cycle systems, the exhaust steam is captured and returned to the heat recovery steam generator 22. This increases the complexity, cost and maintainability because of the addition of steam condenser, circulating water system, condensate water system, and a large cooling tower to reject the low energy heat.

Still referring to FIG. 3, the steam turbine 32 has a turbine 60. The turbine receives the steam 30 from the heat recovery steam generator 22 and rotates the series of blades in the turbine 60 to rotate the shaft 34 connected to the electric generator 36 to produce electric power. The steam exhaust 38 is sent to the exhaust stack 42 to mix with the exhaust gas 20.

In the heat recovery steam generator 22, the heat of the exhaust gas 20 is transferred to water to produce steam. The water to the heat recovery steam generator 22 is provided by the water supply 26. The water 24 is pumped to the heat recovery steam generator 22 by the pump 28, which in a preferred embodiment is an electric driven centrifugal pump. In the heat recovery steam generator 22, the exhaust gas 20 from the gas turbine 12 passes around a plurality of tubes carrying the water 24 to convert the water to steam.

Figure 4:
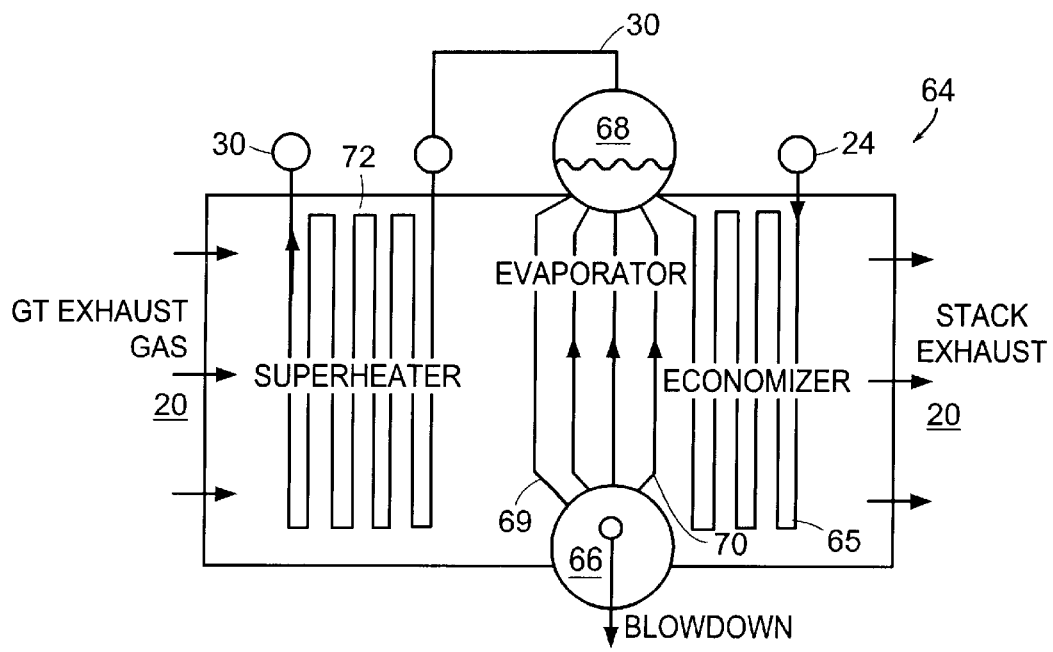
FIG. 4 is a schematic of a drum heat exchanger.

Referring to FIG. 4, a drum heat recovery steam generator 64 is shown. The drum generator 64 has an economizer 65 that receives water in a liquid state 24 from the water supply 26. The exhaust gas 20 passes over the tubes of the economizer 65. The water 24 that passes through the economizer 65 is preheated to near the saturation temperature prior to being feed into the steam generator drum 68. Water 24 flows down from the steam generator drum 68 in at least one down feed tube 69 to a blow-down drum 66 and then flows up through a plurality of steam generating tubes 70 to the steam generator drum 68 by natural circulation. The exhaust gas 20 passes over the tubes 70 to change the pressurized water 24 into a saturated steam 30. The steam 30 passes from the steam generator drum 68 through a plurality of superheater tubes 72 to raise the temperature of the steam 30 above the saturation temperature. The super heated steam 30 is sent to the open cycle steam turbine 32.

Figure 5:
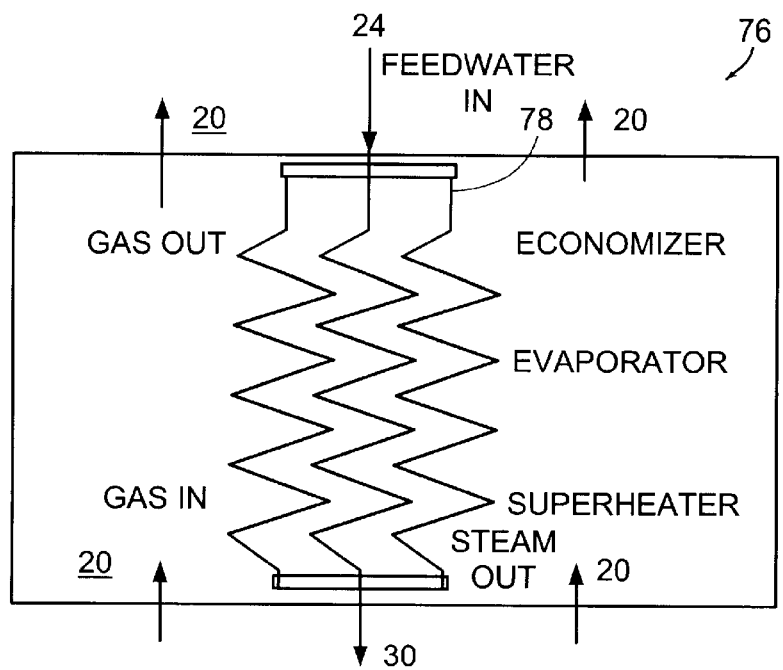
FIG. 5 is a schematic of a once-through counter flow heat exchanger.

FIG. 5 shows a section of an alternative heat recovery steam generator 22. The generator 22 is a once-through exchanger 76. The exchanger 76 has a plurality of tubes 78 for the heat exchange fluid 21, water 24. In the embodiment shown, the exhaust gas 20 flows in one direction and the heat exchange fluid 21 flows in the other. The heat exchange fluid 21, water 24, changes to steam 30 as it absorbs heat energy from the exhaust gas 20 in the heat recovery steam generator 22. As the water flows through the tubes 78, different segments of the tubes 78 act as the economizer, evaporator and superheater.

The water generally needs to be of a better quality in the once-through exchanger 76 then in the drum generator 64. The drum generator 64 has blow-down capability to clean impurities, which is not possible in the once-through exchanger 76.

While two styles of the heat recovery steam generators 22 are shown, it is recognized that other style heat exchangers or heat recovery steam generators can be used. For example, other styles of the heat recovery steam generators 22 include force circulation steam generators or kettle boilers.

The exhaust steam 38 from the steam turbine 32 is released at atmospheric pressure to the exhaust stack 42 as seen in FIG. 1. In addition, the exhaust gas 20 from the gas turbine 12 after passing through the heat recovery steam generator 22 to produce the steam exits from the heat recovery steam generator 22 to the exhaust stack 42.

The steam turbine 32 and the heat recovery steam generator 22 need to be sized relative to the gas turbine 12 of the combined cycle plant 10 in order to operate efficiently. In that the gas turbine 12 typically operates at its base rating, the plant designer knows the power rating of the turbine and its exhaust gas flow rate and temperature. The designer can take the exhaust gas flow temperature and rate to determine what size heat recovery steam generator 22 is needed and how much steam can be produced at a certain pressure, such as 700 PSI at a desired flow rate. The designer with the known flow rate and temperature and pressure of the steam generated by the heat recovery steam generator 22 can size the steam turbine 32 to efficiently convert this energy into rotational energy to drive the electric generator 36 of FIG. 1.

In that the combined cycle plant 10 exhausts both the exhaust gas 20 and the exhaust steam 38 directly to atmosphere, this dual open cycle system simplifies that power plant design from the prior art and reduces maintenance and installation cost. In addition, it improves the reliability of the power plant over the previous combined cycle plants.

Over the past 35 years, gas turbines have been increasingly used to generate electric power because of their low cost, short installation time and the high availability of clean burning oil and natural gas fuels. Many different manufacturers through out the world have installed thousands of engines as simple cycle power plants. Most of these plants operate at a fuel efficiency of 25% to 35%. One of the most popular large engines is General Electric Company's Frame 7 that was first commercialized in 1969. The current version of this model is the Frame 7EA with a power rating of 85,000 kilowatts. It has an exhaust gas flow of 2,367,000 lbs/hour at a temperature of 1000° F. The heat energy in this exhaust gas can be converted in a heat recovery steam generator to produce over 350,000 lbs/hour of high and low pressure steam. This will generate 30,000 kilowatts of power when expanded through an atmospheric discharge, back-pressure steam turbine. Any simple cycle gas turbine plant can achieve similar results by installing a heat recovery steam generator 22, a steam turbine/generator set 32 and 36 and a water purifier 26.

The claims should not be read as limited to the described order or elements unless stated to that effect. Therefore, all embodiments that come within the scope and spirit of the following claims and equivalents thereto are claimed as the invention.

What is claimed:

1. A combined cycle system comprising: an open cycle system using a fuel to create power and expending an exhaust with a waste heat; a heat exchange fluid; a heat recovery exchanger for transferring heat from the exhaust with waste heat to the heat exchange fluid; a second open cycle system using the heat exchange fluid to create power and expending the heat exchange fluid; and an exhaust system that combines the exhaust from the first open cycle and the heat exchange fluid from the second open cycle and conveying to the atmosphere.

2. A combined cycle system of claim 1 wherein the heat exchange fluid is water in a fluid and gaseous state.

3. A combined cycle system of claim 2 further comprising a pump for moving and pressurizing the water to the heat recovery exchanger.

4. A combined cycle system of claim 3 further comprising a purifier for purifying the water.

5. A combined cycle system of claim 3 wherein the open cycle system is a gas turbine.

6. A combined cycle system comprising: an open cycle system using a fuel to create power and expending an exhaust with a waste heat; water as a heat exchange fluid; a heat recovery exchanger for transferring heat from the exhaust with waste heat to the water to convert from a liquid state to a gaseous state, steam; an open cycle system steam turbine using the steam to create power and expending the steam; and an exhaust system that combines the exhaust from the gas turbine and the steam expended from the open cycle steam turbine and conveying to the atmosphere.

7. A combined cycle system of claim 6 wherein the heat recovery exchanger is a once-through exchanger.

8. A combined cycle system of claim 6 wherein the heat recovery exchanger is a drum boiler.

9. A combined cycle system of claim 8 wherein the open cycle system is a gas turbine.

10. A combined cycle system of claim 9 further comprising a pump for moving and pressurizing the water to the drum boiler heat recovery exchanger and a purifier for purifying the water.

11. A combined cycle system comprising: an open cycle system gas turbine using a fuel to create power and expending an exhaust with a waste heat; water as a heat exchange fluid; a heat recovery exchanger for transferring heat from the exhaust with waste heat to the water to convert from a liquid state to a gaseous state, steam; a pump for moving and pressurizing the water to the heat recovery exchanger; an open cycle system steam turbine using the steam to create power and expending the steam; and an exhaust system that combines the exhaust from the gas turbine with the steam expended from the open cycle steam turbine and conveying to the atmosphere.

12. A combined cycle system of claim 11 wherein the heat recovery exchanger is a drum boiler.

13. A combined cycle system of claim 12, wherein the open cycle system steam turbine creates in a range of between 30 to 45 percent of the power produced by the gas turbine.

14. A combined cycle system of claim 13 wherein the open cycle system steam turbine creates in a range of between 34 to 40 percent of the power produced by the gas turbine.

15. A dual-fluid heat engine comprising:
a compressor for compressing a first working fluid, the compressor having
a compressor outlet;
a combustion chamber in fluid communication with the compressor outlet;
a gas turbine having an inlet in fluid communication with the combustion
chamber for performing work by expansion of the first working fluid, and a
gas turbine exhaust;
a heat recovery exchanger coupled to the gas turbine exhaust having a heat recovery inlet and an outlet for heating a second working fluid;
a pump to increase the pressure of the second working fluid prior to entrance into the heat recovery exchanger;

an atmospheric exhaust expansion steam turbine, the steam turbine extracts energy from the heated working fluid to drive an electrical generator; and an exhaust chimney that combines the gas turbine exhaust with the steam turbine exhaust and rejects the exhaust from the gas turbine and the steam turbine into the atmosphere.

16. A dual-fluid thermal energy conversion system comprising: an air compression mechanism for compressing air; a combustion mechanism in fluid communication with the air compression mechanism, wherein a fuel is mixed with the air, ignited and burned to produce a first working fluid; a first expansion mechanism in fluid communication with the combustion mechanism for conversion of a portion of the thermal energy from the first working fluid into mechanical energy which is employed to drive a first machine; a heat exchanging mechanism in fluid communication with the first expansion means, the heat exchanging mechanism transferring a portion of the 'thermal energy from the first working fluid to a second working fluid; a first exhaust mechanism in fluid communication with the heat exchanging mechanism to receive and convey the first working fluid to the atmosphere; a second expansion mechanism in fluid communication with the heat exchanger mechanism receiving the second working fluid and converting thermal energy from the second working fluid into mechanical energy to drive a second machine; a second exhaust mechanism in fluid communication with the second expansion mechanism to receive and convey the second working fluid to the atmosphere; and the first exhaust mechanism and the second exhaust mechanism are interconnected so as to mix the first working fluid with the second working fluid prior to exhausting the mixture to the atmosphere.

17. A method of improving performance of a gas turbine power plant comprising the steps of:

providing an open cycle gas turbine system power plant using a fuel to generate power and expending an exhaust gas;

pressurizing a quantity of water;

extracting heat from the exhaust gas and heating the water to convert to steam;

rotating a steam turbine with the steam to generate more power; and combining the exhaust gas from the gas turbine with the steam expending from the steam turbine and conveying to the atmosphere.

* * * * *

UNITED STATES PATENT AND TRADEMARK OFFICE
CERTIFICATE OF CORRECTION

PATENT NO. : 6,715,294 B2
DATED : April 6, 2004
INVENTOR(S) : Rodger O. Anderson It is certified that error appears in the above-identified patent and that said Letters Patent is hereby corrected as shown below:

Column 7,
Line 2, "heated working" should read -- heated second working.--
Line 19, "the thermal energy" should read -- the thermal energy.--

Signed and Sealed this

Twenty-ninth Day of June, 2004

JON W. DUDAS
*Acting Director of the United States Patent and Trademark Office*